United States Patent [19]

Chrisley

[11] Patent Number: 4,759,134
[45] Date of Patent: Jul. 26, 1988

[54] FLEXIBLE LEVEL

[76] Inventor: Barney D. Chrisley, P.O. Box 280, Ingleside, Tex. 78362

[21] Appl. No.: 936,645

[22] Filed: Nov. 26, 1986

[51] Int. Cl.$^4$ ............................................. G01C 5/04
[52] U.S. Cl. ..................................................... 33/367
[58] Field of Search ......................................... 33/367

[56] References Cited
U.S. PATENT DOCUMENTS

| | | | |
|---|---|---|---|
| 762,072 | 6/1904 | Lord | 33/367 |
| 915,084 | 3/1909 | Eberhard | 33/367 |
| 3,842,513 | 10/1974 | Clark | 33/367 |

Primary Examiner—William D. Martin, Jr.
Attorney, Agent, or Firm—Lowe, Price, LeBlanc, Becker & Shur

[57] ABSTRACT

A leveling instrument is provided with a flexible length of tubing extruded with a pair of thin-walled, balloon-like diaphragms at opposite ends thereof. The tubing contains a flow passage filled with liquid in communication with atmospheric pressure acting upon the liquid through the diaphragms. The liquid provides a leveling medium for the instruments for establishing the level of one location with respect to another location. A method of manufacturing the leveling instrument is also disclosed.

13 Claims, 1 Drawing Sheet

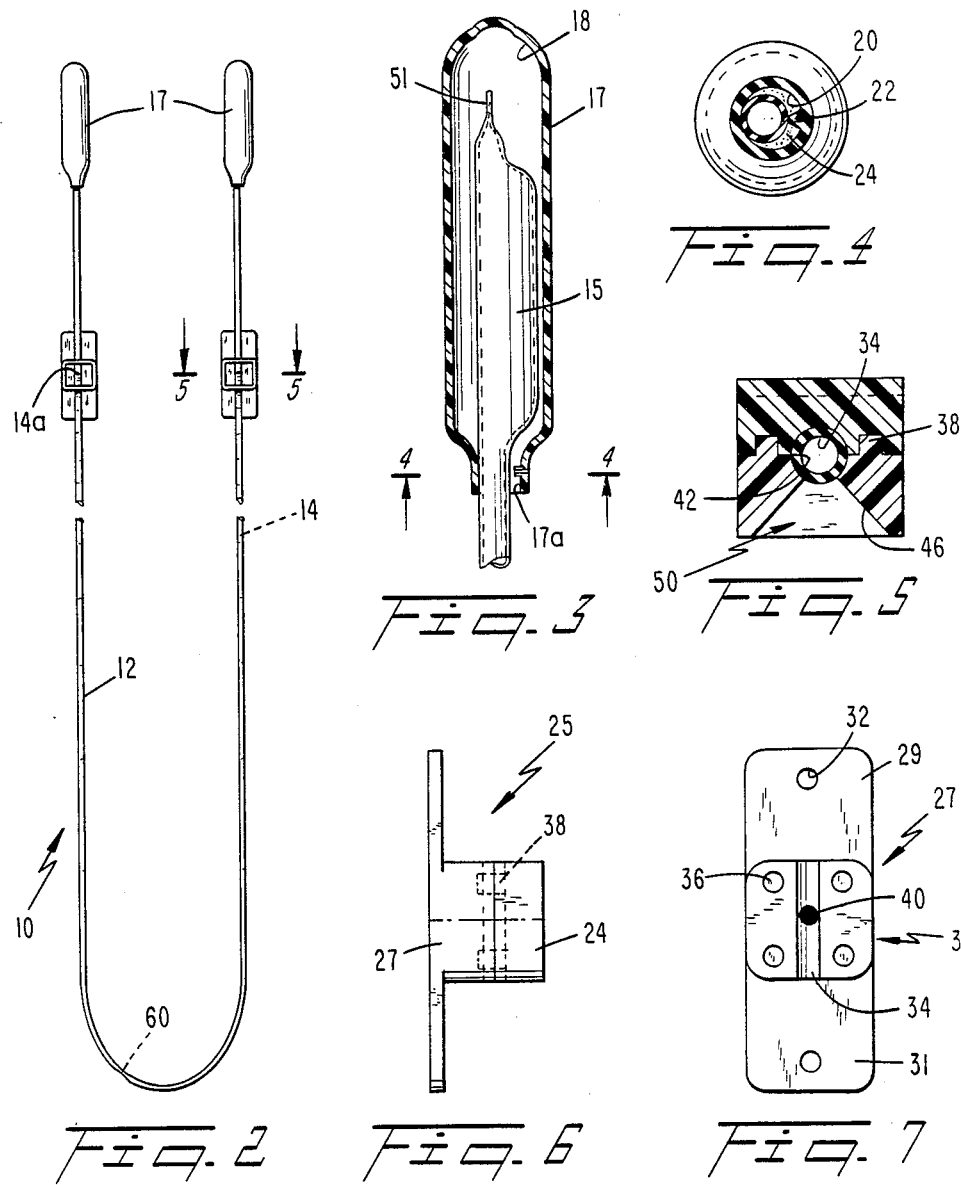

FLEXIBLE LEVEL

TECHNICAL FIELD

The present invention relates generally to leveling apparatus and, more particularly, to leveling apparatus employing a length of flexible tubing enabling two remote points to be leveled relative to each other.

BACKGROUND ART

Flexible leveling instruments employing a length of tubing extending between reference and indicator assemblies are known for use in establishing the level or relative elevations of one location with respect to a second remote location. These instruments, such as disclosed in U.S. Pat. Nos. 762,072; 2,814,127; 3,842,513 and 3,849,898, may be employed in the construction of large building and other structures in which foundations must be laid, floor elevations established, side walls erected, all requiring certain points or locations to be level with respect to each other. Establishing relative elevations of two or more widely spaced points along a large building foundation often presents problems since an ordinary carpenter's level is usually inadequate and expensive surveying equipment (e.g., a transit and rod) is time-consuming to set up and requires skilled workmen to operate.

To avoid the prior art problems, a leveling instrument should be inexpensive, small and compact and one that can be operated by only one person who need not have particular skills in the use of surveying or leveling equipment. While flexible levels avoid the above prior art problems since they generally can be operated by one individual who need have no particular skills in the use of surveying or leveling equipment, there are various problems unique to flexible levels that must be considered in the design process thereof. One such problem relates to the relatively extensive amount of liquid filling the flexible level tube and opposite ends thereof where reference and indicator scales or assemblies are provided. In operation, this fluid must flow through the tubing in either direction depending upon which end of the level is raised or lowered during the leveling process. To enable the fluid to flow within the passage, in a closed system, balloon-like diaphragms are provided respectively on opposite ends of the flexible tubing so that atmospheric pressure can act upon the fluid through the diaphragms. Since the diaphragms are only partially inflated to allow fluid flow in opposite directions, and because of the fragile nature of the diaphragms, air bubbles easily become trapped within the liquid, affecting accuracy of the level; additionally, separation of the diaphragms from the flexible tubing is possible causing fluid leakage and inoperability of the leveling instrument. To avoid these problems, U.S. Pat. No. 3,842,513 to Clark, for example, discloses a leveling instrument having balloon-like diaphragms contained within complicated assemblies with sophisticated valve structures preventing entrainment of air bubbles within the leveling medium while protecting the fragile diaphragms.

Another problem associated with liquid filled flexible levels is that of over-controlling. In other words, raising or lowering one end of the level tends to cause a corresponding increase or reduction in the height of fluid at the opposite end of the level and, in this manner and with the user of scales on opposite ends of the level, two locations are thereby leveled with respect to each other. However, in the process of raising or lowering one end of the level, the rate at which the indicator end of the level is manually vertically adjusted does not always correspond to the rate at which the fluid column in the opposite end of the level rises or falls and such response rate may be dependent upon fluid viscosity, fluid passageway diameter which necessitates vertical movement of the indicator end of the level in small incremental amounts; otherwise, over-controlling occurs, resulting in difficulties in establishing the level or relative elevation of two locations with respect to each other.

It is accordingly one object of the present invention to provide a flexible leveling instrument that is inexpensive, small and compact, and which can be operated by only one individual who need not have skills in the use of surveying or leveling equipment.

Another object of the invention is to provide an improved flexible level that is simple in design and capable of reliable operation in rugged and hostile environments.

Another object is to provide a flexible level having diaphragms at opposite ends thereof for equalizing the pressures acting upon the free surfaces of liquid within the level, and unique means for fixing the diaphragms to the level and protecting same from the external environment.

Still a further object is to provide a leveling instrument that minimizes entrapment of air bubbles within the leveling medium to avoid impairing the accuracy of the instrument without the use of sophisticated valve elements.

Yet another object is to provide a level having inexpensive internal dampening means to provide for a controlled fluid flow rate in the level in either direction to avoid unnecessary fluid oscillation within the level impeding leveling of two locations relative to each other.

DISCLOSURE OF THE INVENTION

A leveling instrument, in accordance with the present invention, comprises a flexible length of tubing having a flow passage and a body of liquid within the passage to provide a leveling medium for the instrument. Visually observable indicia are provided at opposite ends of the tubing to enable the level of one location to be determined with respect to another reference location horizontally spaced from each other. Fluid flow in either direction through the flow passage is permitted by a pair of balloon-like diaphragms fixed respectively to opposite ends of the tubing. The interiors of the diaphragms are in communication with the flow passage to define upper and opposite end closures thereof. The diaphragm establishes atmospheric pressure upon the body of liquid within the flow passage to facilitate fluid flow in opposite directions.

Preferably, flexible protective members are fixed respectively to opposite ends of the tubing about the associated diaphragm to define a pressure space surrounding the diaphragm and in communication with the ambient environment to provide ambient pressures upon the liquid acting through the diaphragm.

According to a preferred embodiment of the present invention, the diaphragms at opposite ends of the flexible tubing are preferably formed by heating said opposite ends placed within a mold cavity having a diameter greater than the diameter of the tubing and then forcing pressurized air through the tubing so that the air 'flows' to permanently stretch the softened portions of the tubing into contact with the mold cavity side walls to form the balloon-like diaphragm. Alternately, the flexible length of tubing and diaphragms at opposite ends thereof may be extruded. In either case, the balloon-like diaphragms are of integral, unitary construction with the tubing. The open opposite ends of the diaphragms are heat-sealed using radio frequency or similar means, following placement of fluid within the flexible tubing, resulting in a simple and rugged structure in which the likelihood of fluid leakage is minimal, particularly when protective boots are placed around the diaphragms as mentioned above.

The protective boots are preferably closed at one end thereof (defining the outermost ends of the level) and are fitted onto the level by inserting the diaphragm into the open ends of the boots. These open ends are glued to the outer surface of the tubing for secure retention. A nipple projecting radially inward from the open end portion of the boot creates an air space establishing communication between the interior to the boots (i.e., diaphragms) and atmosphere.

The leveling medium is preferably a highly viscous fluid, such as a biodegradable oil or silicon that performs the inherent function of dampening the flow rate of fluid within the level to minimize the problem of over-controlling during the leveling process. Fluid dampening is further improved by providing a restriction within the flexible tubing whereby the inner diameter of the flow passage within the restriction is less than the generally uniform diameter prevailing in the remainder of the flow passage. Such a restriction is usually preferred in large diameter tubing (e.g, about ¼" and larger) where, absent the restriction, an excessive flow rate within the tubing may 'break' the fluid meniscus at opposite ends of the fluid, causing air bubbles to become entrapped within the leveling fluid.

Indicator assemblies preferably in the form of sliding bracket scales are provided on each end of the level. Each sliding bracket assembly preferably is formed with two parts wherein opposing facing surfaces are each grooved to establish a vertical passage open at opposite ends thereof. The end of the tubing below the associated diaphragm is slidably received within this passage. The forward facing semicircular groove in the back part of the bracket assembly has a mark which, in operation, provides a reference mark for matching the fluid levels thereagainst on the sliding bracket. Each bracket assembly rear part further includes upper and lower extensions with holes formed therein enabling the bracket assembly to be secured to a vertical surface with a finishing nail or the like. The front part of the bracket assembly has a vertical viewing window defined by tapered front walls sloped inwardly towards the tubing.

Suction cups may be provided at opposite ends of the flexible tubing by securement to a rear surface of the rear component part of the bracket assembly. The suction cups facilitate placement of opposite ends of the level against structures having relatively smooth flat surfaces. Alternatively, the suction cups or the sliding bracket scales may be apertured to facilitate their mounting to rough surfaces (e.g., brick or dry wall) by means of finishing nails.

The various features, objects and advantages of the present invention heretofore discussed, as well as additional objects and advantages thereof especially as regards characteristics of a particular nature will become apparent to those skilled in the art upon consideration of the following description taken in conjunction with the accompanying drawing depicting exemplary embodiments of the present invention.

BRIEF DESCRIPTION OF THE DRAWING:

FIG. 1 is a persepctive view of the flexible level according to the invention in use for securing a pair of shelf brackets to a wall;

FIG. 2 is an enlarged elevational view of the flexible level of FIG. 1;

FIG. 3 is a detailed cross-sectional, enlarged view of the end of the flexible level;

FIG. 4 is a sectional view taken along the line 4—4 of FIG. 3;

FIG. 5 is a sectional view taken along the line 5—5 of FIG. 2;

FIG. 6 is a side elevational view of a sliding bracket assembly of the invention; and FIG. 7 is a front elevational view of a rear component part of the two-part bracket assembly.

BEST MODE FOR CARRYING OUT THE INVENTION

Referring to FIGS. 1 and 2 of the drawing, flexible level 10 according to the present invention comprises a length of flexible tubing 12, such as commercially available polyethylene tubing, containing a fluid 14 (preferably a biodegradable oil or silicon based fluid) of sufficient quantity to define fluid surface levels or meniscus 14a at opposite ends thereof. Each opposite end of level 10 is defined by a thin-walled balloon or diaphragm 15 integrally formed with tubing 12 in the unique manner described below that is surrounded by a thick-walled protective boot 17 (preferably made of plastic) and being open at end 17a thereof for insertion of diaphragm 15 within the protective interior cavity 18 formed within the boot. The open end 17a of boot 18 is adhesively secured to the exterior surface of tubing 12, as depicted in FIG. 3. A clearance or space 20 defined by an inwardly projection nipple 22 formed in end 17a of boot 18 enables communication of the bladders or diaphragms 15 with atmospheric pressure so that the balloons or diaphragms are free to collapse and expand as one end of flexible level 10 is elevationally moved relative to the other end. Nipple 22 is advantageous since adhesive material 24 (FIG. 4) is otherwise used to secure the end 17a of boot 18 to the exterior surface of flexible tubing 12 below the diaphragm.

Each opposite end of flexible tubing 10 is slidably received within a sliding bracket assembly 25. As best depicted in FIGS. 5, 6 and 7, sliding bracket assembly 25 preferably comprises two component parts in the form of a rear part 27 and a front part 29. Rear part 27 (FIG. 7) has upper and lower extensions 29 and 31 each containing a hole 32 enabling the bracket assembly to be secured to a vertical surface against which leveling is to occur with, for example, finishing nails (not shown). Intermediate extensions 29,31 there is formed a central, raised portion 32' containing a groove 34 of semicircular cross-section and four blind holes 36 respectively adapted to receive four mounting projections 38 of front section 29 (FIG. 6). Intermediate opposite ends of groove 34 is a leveling mark 40 to be used for matching the fluid levels thereagainst by sliding the respective brackets as discussed infra.

The front section 29, as best depicted in FIG. 5, is also formed with a semi-cylindrical groove 42 defining a cylindrical passage 44 slidably receiving the exterior surface of tubing 12 in snug fitting slidable contact when the projections 48 are received and preferably adhesively secured within mounting holes 36. The front section 29 includes a pair of sloping front surface 46 extending towards tubing 12 to intersect the groove 42 thereby defining a viewing window 50.

As mentioned above, flexible tubing 12 is preferably commercially available tubing, such as surgical tubing or other plastic tubing material having a side wall thickness of 1/32 inch (approximately 30 mils) with an inside diameter of about ⅛ inch although the tubing may be formed with other wall thicknesses and other inside diameters such as 3/16, ¼, 5/16 inch all thicknesses, etc. However, in accordance with an important feature of the invention, the thickness of diaphragms 15 must be preferably no thicker than 5-6 mils; otherwise, the diaphragms will not be capable of expanding and contracting as the fluid moves from one end of the tubing to the other end. The length of each diaphragm 15 as measured in the longitudinal direction of tubing 12 is preferably on the order of ½ to 1½ inches long with the outside diameter of the bladder or diaphragm 15 approximately ⅜ inch. In any event, it is preferred to dimension the diaphragms 15 to obtain a fluid flow rate of approximately one inch of fluid flow per minute to avoid overcontrolling during the leveling process.

As will occur to those of ordinary skill in the art from the description immediately following, the diaphragms 15 may be formed by extrusion, although a preferred form of manufacture is to position the end of flexible tubing 12 within a mold cavity having one cavity portion corresponding in diameter to the outside tubing diameter and an intermediate cavity portion having a larger diameter corresponding to the final outside diameter of the diaphragm 15. The tubing end is heated to soften the tubing side wall and then compressed air is blown into the open end of the tubing to 'blow' the softened tubing material into contact with the larger cavity portion ultimately defining the diaphragm 15, and, in the process, diaphragm material is expanded to the thinness on the order set forth above. Following formation of diaphragms 15 at opposite end of tubing 12 in the manner set forth above, fluid is then added to tubing 12 until it reaches levels 14a after which the tubing ends may be heat sealed as at 51 using radio frequency or other sealing techniques to define a closed system. Afterwards, boots 18 are fitted over the diaphragms 15 in the manner described above to provide protection preventing damage to the thin walled diaphragms.

It will be apparent from the aforesaid description that the flexible level 10 of the invention has air within opposite ends, said air being provided in sufficient quantity at standard temperature and pressure (STP) so that the diaphragms 15 are partially inflated. In this manner, movement of the fluid from one end to the other by raising or lowering one of said ends will in fact occur by allowing one balloon or diaphragm (toward which fluid is moving) to inflate while the other diaphragm collapses.

In accordance with another feature of the invention, particularly when the inside diameter of flexible tubing 12 is large (i.e., greater than ⅛ inch), there is provided an internal restriction 60 (FIG. 2) through which fluid flows during the leveling process. Internal restriction 60 has a diameter that is less than the normal diameter generally prevailing within tubing 12. Restriction 60 functions to decrease the rate of fluid flow within the tubing to prevent rupture of the meniscus defining each fluid level and to also prevent bubbles from traveling from one end of the tubing to another.

In operation, flexible level 10 is initially placed in the FIG. 1 or FIG. 2 position such that protective boots 17 are at the upper most ends thereof to enable all of fluid 14 to run out of diaphragms 15 in the event such fluid has inadvertently entered the diaphragms. Occasionally, it is necessary to squeeze protectors or boots 17 to ensure that all of fluid 14 possibly being trapped therein in fact flows towards the intermediate tubing portions. In the FIG. 1 or FIG. 2 position, alternate squeezing of protectors 17 advantageously enable the air bubbles possibly trapped in the fluid to rise to the surface. Once all of the fluid is in the intermediate section of level 10 and the air bubbles are removed from the fluid in the aforesaid manner, level 10 is calibrated by placing both of sliding bracket assemblies 25 side-by-side with each other (not shown in detail); each tubing end is then manually slid through the associated bracket assembly until the associated fluid level or meniscus 14a matches the mark 40. Afterwards, one end of flexible level 10 is placed on a predetermined level mark such as at 70 in FIG. 1 by locating the associated fluid level 14a (i.e., mark 40) at the mark 70. The other end of level 10 (i.e., the right-hand end at FIG. 1 is then manually adjusted to determine a level location corresponding to mark 70 by slowly rasising or lowering that end of the level in the directions depicted by the arrows until the fluid level is even with the mark 40 on the sliding bracket assembly (in this case the right-hand bracket assembly in FIG. 1). In this manner, two level locations can be easily ascertained.

From the foregoing description, it will now be understood by those skilled in the art that flexible level 10 has numerous uses. For example, level 10 can be used to find levels for dropped ceiling, for conduit running, mounting switch gear and handing lights. Plumbers may use level 10 for running pipes and finding the proper grade elevations for drainage line and roughing in slabs. Pipe fitters may use level 10 for running pipes and finding the correct height for pipe supports, while iron workers may use the level for determining level horizontal points in steel structures. Other uses will obviously occur based upon the foregoing description including that of determining level marks on opposite sides of a room corner.

The foregoing dimensions of bladder or diaphragms 15 (i.e., length, outside diameter, etc.) are merely preferred and obviously other dimensions may be employed. However, if the diaphragms 15 are too large, then the fluid flow rate within tubing 12 increases and it becomes more difficult to stabilize the fluid levels 14a within the leveling process. The dimensions provided above are generally sufficient to provide a fluid flow rate in the range of ¾ to 1¼ inches per minute which is desirable from the standpoint of manually raising or lowering the ends of level 10 in determining two level locations.

While there is shown and described only the preferred embodiment of the invention in sufficient detail, it will be understood that such details are essentially illustrative of the principles involved and that various changes may be made without departing from the scope of the appended claims.

What is claimed is:

1. A leveling instrument for establishing the level of one location with respect to another location spaced therefrom, comprising:
   (a) a flexible length of tubing having a flow passage and a body of liquid within said flow passage to provide a leveling medium for said instrument, and visually observable indicia means located at opposite end portions of said tubing for enabling said one location and another like level location to be determined relative to each other; and
   (b) a pair of diaphragms formed respectively at opposite end portions of said tubing, the interiors of said diaphragms being in communication with the flow passage, said diaphragms being formed by softening the end portions of said tubing material and providing a compressed fluid into the tubing to expand the softened end portions into said diaphragms having diameters respectively greater than the diameter of the tubing and a wall thickness less than the wall thickness of the tubing.

2. A leveling instrument for establishing the level of one location with respect to another location spaced therefrom, comprising a flexible length of tubing having a flow passage and opposite ends of said tubing establishing a pair of diaphragms of integral, unitary construction with said tubing, the interiors of said diaphragms being in communication with the flow passage to define upper and opposite end closures thereof, said diaphragms enabling the body of liquid to flow within said flow passage, said diaphragms being formed by softening the end portions of said tubing material and providing a compressed fluid into the tubing to expand the softened end portions into said diaphragms having diameters respectively greater than the diameter of the tubing and a wall thickness less than the wall thickness of the tubing.

3. The leveling instrument of claim 1, further including a flexible protective member fixed to opposite ends of said tubing about the associated diaphragm to define a space surrounding said diaphragm and in communication with the ambient environment allow said ambient pressures to act upon said body of liquid through said diaphragms.

4. The leveling instrument of claim 3, wherein said flow passage has a substantially constant inner diameter D except at a flow portion thereof having an inner diameter d, wherein $D<d$, said flow portion thereby defining a restriction resulting in a metered flow of fluid through said restriction as one end of said level is elevationally varied relative to said other end.

5. The leveling instrument of claim 4, wherein said restriction is formed by heating and stretching a portion of said flexible tubing to attain the reduced diameter d within said heated and stretched section.

6. The leveling instrument of claim 3, wherein each diaphragm wall has a thickness of approximately ½-6 mils.

7. The leveling instrument of claim 1, wherein each diaphragm is formed in a partially inflated condition with a wall thickness sufficient so that one of the diaphragms inflates as fluid in the tubing flows towards it while the other diaphragm collapses as said fluid flows away from it.

8. The leveling instrument of claim 2, wherein extreme ends of the extruded diaphragm members are heat-sealed to define a fluid flow system within said tubing and diaphragms sealed from the ambient environment.

9. The leveling instrument of claim 2, wherein said body of liquid is silicon.

10. The leveling instrument of claim 9, wherein said body of liquid is biodegradable oil.

11. A method of manufacturing a leveling instrument which comprises a flexible length of tubing having a pair of diaphragms fixed respectively to opposite ends of said tubing, a body of liquid being disposed within said tubing and the interiors of said diaphragms being in communication with the body of liquid within the flow passage, comprising the steps of:
   (a) extruding said flexible length of tubing to form said flow passage therewithin;
   (b) forming said diaphragms at opposite ends of each length of flexible tubing by softening the end portions of said tubing material and providing a compressed fluid into the tubing to expand the softened end portions into said diaphragms having diameters respectively greater than the diameter of the tubing and a wall thickness less than the wall thickness of the tubing;
   (c) filling said tubing through one end thereof with a leveling liquid; and
   (d) sealing open ends of said diaphragms to close off said liquid from ambient conditions and thereby prevent leakage.

12. The method of claim 11, comprising the further step of partially compressing each diaphragm prior to and during sealing so that the resulting sealed diaphragm is partially compressed.

13. A method of manufacturing an instrument which comprises a flexible length of tubing having at least one diaphragm fixed to one end of said tubing, comprising the steps of:
   (a) extruding said flexible length of tubing to form a passage therewithin;
   (b) forming said diaphragm by softening the end portion of said tubing material and providing a compressed fluid into the tubing to expand the softened end portion into said diaphragm having a diameter respectively greater than the diameter of the tubing and wall thickness less than the wall thickness of said tubing; and
   (c) sealing the open end of said diaphragm such that said diaphragm communicates only with the interior passage of the tubing.

* * * * *